US012146973B2

(12) United States Patent
Manolakos et al.

(10) Patent No.: US 12,146,973 B2
(45) Date of Patent: Nov. 19, 2024

(54) POSITIONING MEASUREMENT/REPORTING WITH MULTIPLE DISCONTINUOUS RECEPTION GROUPS

(71) Applicant: QUALCOMM Incorporated, San Diego, CA (US)

(72) Inventors: Alexandros Manolakos, Escondido, CA (US); Weimin Duan, San Diego, CA (US); Wanshi Chen, San Diego, CA (US); Krishna Kiran Mukkavilli, San Diego, CA (US); Tingfang Ji, San Diego, CA (US); Naga Bhushan, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 334 days.

(21) Appl. No.: 17/793,066

(22) PCT Filed: Jan. 27, 2021

(86) PCT No.: PCT/US2021/015284
§ 371 (c)(1),
(2) Date: Jul. 15, 2022

(87) PCT Pub. No.: WO2021/154848
PCT Pub. Date: Aug. 5, 2021

(65) Prior Publication Data
US 2023/0067569 A1     Mar. 2, 2023

(30) Foreign Application Priority Data
Jan. 29, 2020 (GR) ............................. 20200100044

(51) Int. Cl.
*G01S 5/00*     (2006.01)
*H04W 24/10*     (2009.01)
*H04W 76/28*     (2018.01)

(52) U.S. Cl.
CPC .......... *G01S 5/0036* (2013.01); *H04W 24/10* (2013.01); *H04W 76/28* (2018.02)

(58) Field of Classification Search
CPC ...... G01S 5/0036; H04W 76/28; H04W 24/10
See application file for complete search history.

(56) References Cited

U.S. PATENT DOCUMENTS 10,557,919 B2 *   2/2020   Irvine ...................... H01Q 3/36
10,588,109 B2 *   3/2020   Xue ...................... G01S 5/0081
(Continued)

FOREIGN PATENT DOCUMENTS

CN     102714877 A     10/2012
CN     114374491 A    *   4/2022
(Continued)

OTHER PUBLICATIONS

International Search Report and Written Opinion—PCT/US2021/015284—ISA/EPO—May 14, 2021.
(Continued)

*Primary Examiner* — Adam D Houston
(74) *Attorney, Agent, or Firm* — SUNSTEIN LLP

(57) ABSTRACT

A UE includes: a transceiver; a memory; and a processor configured to: receive first and second discontinuous reception configurations for first and second discontinuous reception groups; receive first and second positioning signal configurations for first and second positioning signals associated with the first and second discontinuous reception groups, respectively; measure the first positioning signal during a first active time of the first discontinuous reception group; and measure the second positioning signal during a
(Continued)

fixed second active time or during a variable third active time, the fixed second active time having a fixed duration of the second discontinuous reception group and the variable third active time having a variable duration of the second discontinuous reception group.

40 Claims, 12 Drawing Sheets

(56) References Cited

U.S. PATENT DOCUMENTS

| | | | |
|---|---|---|---|
| 11,310,339 B2 * | 4/2022 | Fänge | H04L 67/01 |
| 11,356,804 B2 * | 6/2022 | Edge | H04W 64/00 |
| 2011/0170420 A1 | 7/2011 | Xi et al. | |
| 2013/0033999 A1 * | 2/2013 | Siomina | H04W 64/00 370/252 |
| 2018/0255607 A1 | 9/2018 | Nagaraja et al. | |
| 2019/0182794 A1 | 6/2019 | Wong et al. | |
| 2023/0067569 A1 * | 3/2023 | Manolakos | H04W 76/28 |
| 2023/0362817 A1 * | 11/2023 | Da Silva | H04W 24/10 |
| 2024/0015846 A1 * | 1/2024 | Leng | H04W 28/26 |

FOREIGN PATENT DOCUMENTS

| | | | | |
|---|---|---|---|---|
| WO | 2012112104 A1 | | 8/2012 | |
| WO | WO-2018028925 A1 | * | 2/2018 | ........ H04W 52/0209 |
| WO | 2018160969 | | 9/2018 | |
| WO | WO-2021154848 A1 | * | 8/2021 | ........... G01S 5/0036 |
| WO | WO-2022016335 A1 | * | 1/2022 | ........... G01S 13/765 |
| WO | WO-2024126181 A1 | * | 6/2024 | |

OTHER PUBLICATIONS

NEC: "General Aspects on cDRX Enhancement", 3GPP Draft, R2-1916187, 3GPP TSG-RAN WG2 #108, 3rd Generation Partnership Project (3GPP), Mobile Competence Centre, 650, Route Des Lucioles, F-06921 Sophia-Antipolis Cedex, France, vol. RAN WG2, No. Reno, USA, Nov. 18, 2019-Nov. 22, 2019, Nov. 8, 2019 (Nov. 8, 2019), pp. 1-2, XP051817731, Retrieved from the Internet: URL: https://ftp.3gpp.org/tsg_ran/WG2_RL2/TSGR2_108/Docs/R2-1916187.zip. F55R2-1916187 cDRX enh.docx [retrieved-on Nov. 8, 2019] Par. 2.

* cited by examiner

POSITIONING MEASUREMENT/REPORTING WITH MULTIPLE DISCONTINUOUS RECEPTION GROUPS

CROSS-REFERENCE TO RELATED APPLICATIONS

This application is the National Stage of International Application No. PCT/US2021/015284, filed Jan. 27, 2021, entitled "POSITIONING MEASUREMENT/REPORTING WITH MULTIPLE DISCONTINUOUS RECEPTION GROUPS," which claims the benefit of Greek patent application No. 20200100044, filed Jan. 29, 2020, entitled "POSITIONING MEASUREMENT/REPORTING WITH MULTIPLE DISCONTINUOUS RECEPTION GROUPS," both of which are assigned to the assignee hereof, and the entire contents of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

An example user equipment (UE) includes: a transceiver; a memory; and a processor communicatively coupled to the transceiver and the memory, where the processor is configured to: receive, via the transceiver, a first discontinuous reception configuration for a first discontinuous reception group and a second discontinuous reception configuration for a second discontinuous reception group; receive, via the transceiver, a first positioning signal configuration for a first positioning signal associated with the first discontinuous reception group and a second positioning signal configuration for a second positioning signal associated with the second discontinuous reception group; measure the first positioning signal during a first active time of the first discontinuous reception group; and measure the second positioning signal during a fixed second active time or during a variable third active time, the fixed second active time having a fixed duration of the second discontinuous reception group and the variable third active time having a variable duration of the second discontinuous reception group.

Implementations of such a UE may include one or more of the following features. The variable third active time includes the fixed second active time. The variable third active time ends no later than an end of the first active time. The variable third active time comprises a plurality of separate time portions. The fixed second active time has a shorter duration than a duration of the first active time. The processor is configured to determine positioning information based on the first positioning signal and the second positioning signal. The positioning information comprises at least one of a received signal time difference (RSTD) measurement, a position estimate, or a reference signal received power (RSRP) measurement. The positioning information comprises an RSTD measurement across a plurality of transmission/reception points, an RSTD measurement across a plurality of frequency layers, an RSTD measurement of positioning reference signal (PRS) resources of different frequency layers, or an RSTD measurement of PRS resource sets of different frequency layers. The positioning information comprises an RSRP measurement of a plurality of beams, an RSRP measurement of multiple positioning reference signal (PRS) resources, or an RSRP measurement across a plurality of transmission/reception points.

Also or alternatively, implementations of such a UE may include one or more of the following features. The processor is configured to determine a UE Rx-Tx based on at least one of the first positioning signal or the second positioning signal, and a transmitted reference signal sent by the processor via the transceiver. The processor is configured to change from measuring the second positioning signal during the fixed second active time to measuring the second positioning signal during the variable third active time. The processor is configured to respond to the first positioning signal configuration and the second positioning signal configuration indicating that the first positioning signal and the second positioning signal are scheduled for periodic transmission by causing the processor to measure the second positioning signal during the fixed second active time.

Also or alternatively, implementations of such a UE may include one or more of the following features. The processor is configured to determine whether to cause the processor to measure the second positioning signal during the fixed second active time or to measure the second positioning signal during the variable third active time based on timing of reception, via the transceiver, of at least one of the first positioning signal or a positioning reporting request. The processor is configured to respond to receiving an aperiodic positioning reporting request by measuring the second positioning signal during the variable third active time. The processor is configured to respond to receiving, aperiodically, the first positioning signal by measuring the second positioning signal during the variable third active time. The processor is configured to respond to the first positioning signal configuration being indicative of aperiodic transmission, or the second positioning signal configuration being indicative of aperiodic transmission, by measuring the second positioning signal during the variable third active time.

Also or alternatively, implementations of such a UE may include one or more of the following features. The first positioning signal and the second positioning signal each comprise one of a positioning reference signal (PRS) resource or a PRS resource set. The first positioning signal is implicitly associated with the first discontinuous reception group, the first positioning signal having a first frequency that is part of a first component carrier band, a first band combination, or a first frequency range of the first discontinuous reception group, or the second positioning signal is implicitly associated with the second discontinuous reception group, the second positioning signal having a second frequency that is part of a second component carrier band, a second band combination, or a second frequency range of the second discontinuous reception group, or a combination thereof.

An example method of performing positioning operations at a user equipment (UE) includes: receiving, at the UE, a first discontinuous reception configuration for a first discontinuous reception group and a second discontinuous reception configuration for a second discontinuous reception group; receiving, at the UE, a first positioning signal configuration for a first positioning signal associated with the first discontinuous reception group and a second positioning signal configuration for a second positioning signal associated with the second discontinuous reception group; measuring, at the UE, the first positioning signal during a first active time of the first discontinuous reception group; and measuring the second positioning signal during a fixed second active time or a variable third active time, the fixed second active time having a fixed duration of the second discontinuous reception group and the variable third active time having a variable duration of the second discontinuous reception group.

Implementations of such a method may include one or more of the following features. The variable third active time includes the fixed second active time. The variable third active time ends no later than an end of the first active time. The variable third active time comprises a plurality of separate time portions. The fixed second active time has a shorter duration than a duration of the first active time. The method includes determining positioning information based on the first positioning signal and the second positioning signal. The positioning information comprises at least one of a received signal time difference (RSTD) measurement, a position estimate, or a reference signal received power (RSRP) measurement. The positioning information comprises an RSTD measurement across a plurality of transmission/reception points, an RSTD measurement across a plurality of frequency layers, an RSTD measurement of positioning reference signal (PRS) resources of different frequency layers, or an RSTD measurement of PRS resource sets of different frequency layers. The positioning information comprises an RSRP measurement of a plurality of beams, an RSRP measurement of multiple positioning reference signal (PRS) resources, or an RSRP measurement across a plurality of transmission/reception points.

Also or alternatively, implementations of such a method may include one or more of the following features. The method includes: transmitting a transmitted reference signal by the UE; and determining a UE Rx-Tx based on at least one of the first positioning signal or the second positioning signal, and the transmitted reference signal. The method includes changing from measuring the second positioning signal during the fixed second active time to measuring the second positioning signal during the variable third active time. The method includes measuring the second positioning signal during the fixed second active time in response to the first positioning signal configuration and the second positioning signal configuration being indicative of periodic transmission of the first positioning signal and the second positioning signal, respectively.

Also or alternatively, implementations of such a method may include one or more of the following features. The method includes determining whether to measure the second positioning signal during the fixed second active time or to measure the second positioning signal during the variable third active time based on timing of reception of at least one of the first positioning signal or a positioning reporting request. The method includes responding to receiving an aperiodic positioning reporting request by measuring the second positioning signal during the variable third active time. The method includes responding to receiving, aperiodically, the first positioning signal by measuring the second positioning signal during the variable third active time. The method includes responding to the first positioning signal configuration being indicative of aperiodic transmission, or the second positioning signal configuration being indicative of aperiodic transmission, by measuring the second positioning signal during the variable third active time.

Also or alternatively, implementations of such a method may include one or more of the following features. The first positioning signal and the second positioning signal each comprise one of a positioning reference signal (PRS) resource or a PRS resource set. The first positioning signal and the second positioning signal are from different frequency layers. The first positioning signal and the second positioning signal are from different transmission/reception points. The first positioning signal configuration and the second positioning signal configuration correspond to different frequency ranges, respectively.

An example non-transitory, processor-readable storage medium includes processor-readable instructions to cause a processor to: receive, via a transceiver, a first discontinuous reception configuration for a first discontinuous reception group and a second discontinuous reception configuration for a second discontinuous reception group; receive, via the transceiver, a first positioning signal configuration for a first positioning signal associated with the first discontinuous reception group and a second positioning signal configuration for a second positioning signal associated with the second discontinuous reception group; measure the first positioning signal during a first active time of the first discontinuous reception group; and measure the second positioning signal during a fixed second active time or during a variable third active time, the fixed second active time having a fixed duration and the variable third active time having a variable duration.

Implementations of such a storage medium may include one or more of the following features. The variable third active time includes the fixed second active time. The variable third active time ends no later than an end of the first active time. The variable third active time comprises a plurality of separate time portions. The fixed second active time has a shorter duration than a duration of the first active time. The instructions are configured to cause the processor to determine positioning information based on the first positioning signal and the second positioning signal. The positioning information comprises at least one of a received signal time difference (RSTD) measurement, a position estimate, or a reference signal received power (RSRP) measurement. The positioning information comprises an RSTD measurement across a plurality of transmission/reception points, an RSTD measurement across a plurality of frequency layers, an RSTD measurement of positioning reference signal (PRS) resources of different frequency layers, or an RSTD measurement of PRS resource sets of different frequency layers. The positioning information comprises an RSRP measurement of a plurality of beams, an RSRP measurement of multiple positioning reference signal (PRS) resources, or an RSRP measurement across a plurality of transmission/reception points.

Also or alternatively, implementations of such a storage medium may include one or more of the following features. The instructions include instructions to cause the processor to determine a UE Rx-Tx based on at least one of the first positioning signal or the second positioning signal, and a transmitted reference signal sent by the processor via the transceiver. The instructions include instructions to cause the processor to change from measuring the second positioning signal during the fixed second active time to measuring the second positioning signal during the variable third active time. The instructions include instructions to cause the processor to respond to the first positioning signal configuration and the second positioning signal configuration indicating that the first positioning signal and the second positioning signal are scheduled for periodic transmission by measuring the second positioning signal during the fixed second active time.

Also or alternatively, implementations of such a storage medium may include one or more of the following features. The instructions include instructions to cause the processor to determine whether to cause the processor to measure the second positioning signal during the fixed second active time or to measure the second positioning signal during the variable third active time based on timing of reception, via the transceiver, of at least one of the first positioning signal or a positioning reporting request. The instructions include instructions to cause the processor to respond to receiving an aperiodic positioning reporting request by measuring the second positioning signal during the variable third active time. The instructions include instructions to cause the processor to respond to receiving, aperiodically, the first positioning signal by measuring the second positioning signal during the variable third active time. The instructions include instructions to cause the processor to respond to the first positioning signal configuration being indicative of aperiodic transmission, or the second positioning signal configuration being indicative of aperiodic transmission, by measuring the second positioning signal during the variable third active time Also or alternatively, implementations of such a storage medium may include one or more of the following features. The first positioning signal and the second positioning signal each comprise one of a positioning reference signal (PRS) resource or a PRS resource set.

An example user equipment (UE) includes: means for receiving a first discontinuous reception configuration for a first discontinuous reception group and a second discontinuous reception configuration for a second discontinuous reception group; means for receiving a first positioning signal configuration for a first positioning signal associated with the first discontinuous reception group and a second positioning signal configuration for a second positioning signal associated with the second discontinuous reception group; means for measuring the first positioning signal during a first active time of the first discontinuous reception group; and means for measuring the second positioning signal during a fixed second active time or during a variable third active time, the fixed second active time having a fixed duration of the second discontinuous reception group and the variable third active time having a variable duration of the second discontinuous reception group.

Also or alternatively, implementations of such a UE may include one or more of the following features. The variable third active time includes the fixed second active time. The variable third active time ends no later than an end of the first active time. The variable third active time comprises a plurality of separate time portions. The fixed second active time has a shorter duration than a duration of the first active time. The UE includes means for determining positioning information based on the first positioning signal and the second positioning signal. The positioning information comprises at least one of a received signal time difference (RSTD) measurement, a position estimate, or a reference signal received power (RSRP) measurement. The positioning information comprises an RSTD measurement across a plurality of transmission/reception points, an RSTD measurement across a plurality of frequency layers, an RSTD measurement of positioning reference signal (PRS) resources of different frequency layers, or an RSTD measurement of PRS resource sets of different frequency layers. The positioning information comprises an RSRP measurement of a plurality of beams, an RSRP measurement of multiple positioning reference signal (PRS) resources, or an RSRP measurement across a plurality of transmission/reception points.

Also or alternatively, implementations of such a UE may include one or more of the following features. The UE includes: means for transmitting a transmitted reference signal by the UE; and means for determining a UE Rx-Tx based on at least one of the first positioning signal or the second positioning signal, and the transmitted reference signal. The UE includes means for changing from measuring the second positioning signal during the fixed second active time to measuring the second positioning signal during the variable third active time. The means for measuring the second positioning signal during the fixed second active time are for measuring the second positioning signal during the second active time in response to the first positioning signal configuration and the second positioning signal configuration being indicative of periodic transmission of the first positioning signal and the second positioning signal, respectively.

Also or alternatively, implementations of such a UE may include one or more of the following features. The UE includes means for determining whether to measure the second positioning signal during the fixed second active time or to measure the second positioning signal during the variable third active time based on timing of reception of at least one of the first positioning signal or a positioning reporting request. The means for measuring the second positioning signal during the variable third active time are for measuring the second positioning signal during the variable third active time in response to the UE receiving an aperiodic positioning reporting request. The means for measuring the second positioning signal during the variable third active time are for measuring the second positioning signal during the variable third active time in response to the UE receiving, aperiodically, the first positioning signal. The means for measuring the second positioning signal during the variable third active time are for measuring the second positioning signal during the variable third active time in response to the first positioning signal configuration being indicative of aperiodic transmission or the second positioning signal configuration being indicative of aperiodic transmission.

Also or alternatively, implementations of such a UE may include one or more of the following features. The first positioning signal and the second positioning signal each comprise one of a positioning reference signal (PRS) resource or a PRS resource set.

DETAILED DESCRIPTION

Figure 1:
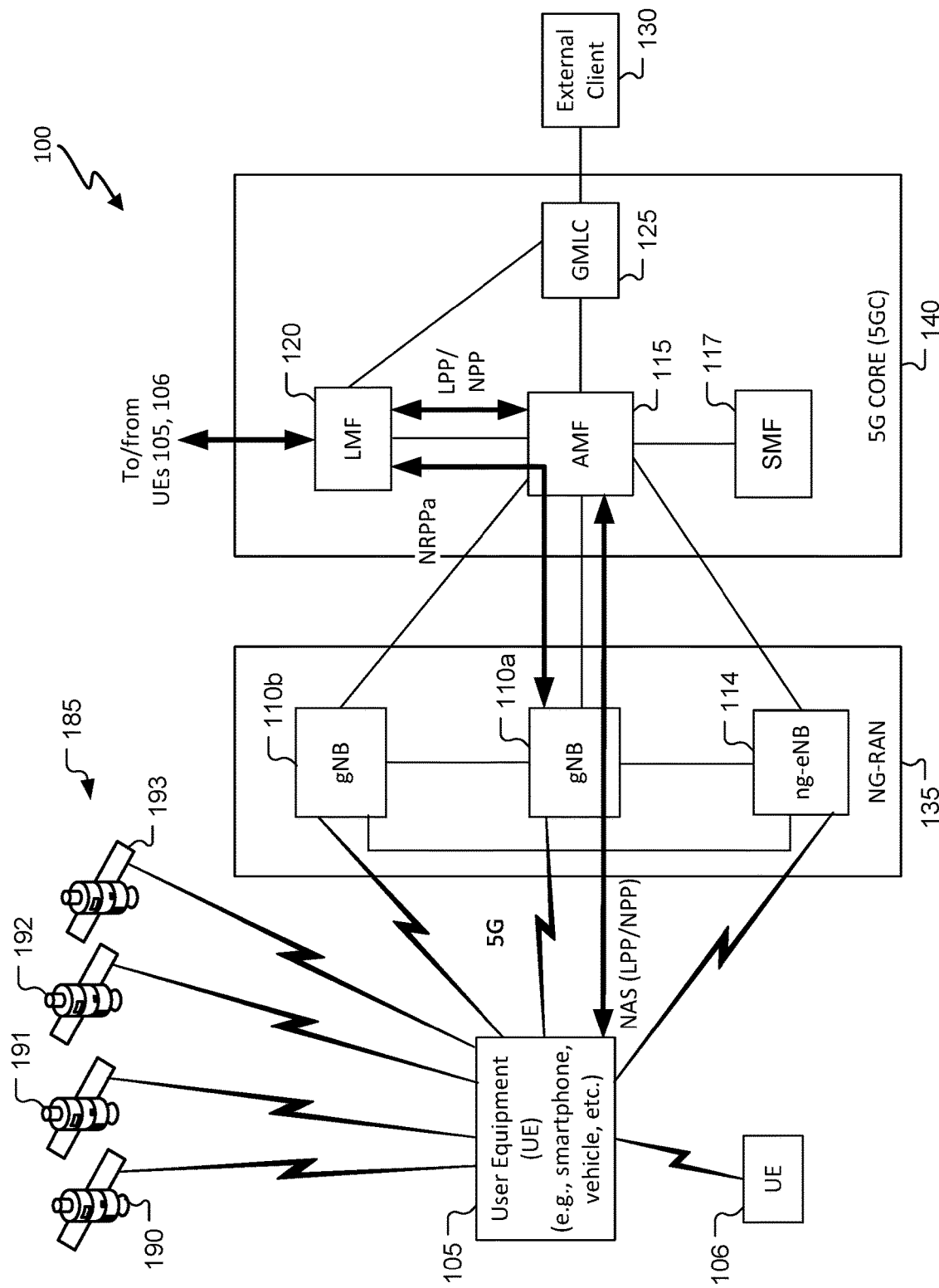
FIG. 1 is a simplified diagram of an example wireless communications system.

Techniques are discussed herein for interaction between multiple discontinuous reception (DRX) groups and positioning signal measuring and reporting. Multiple DRX groups may be established for a user equipment (UE), for example with an active time of a first group being longer than the active time of a second group. Each DRX group may be associated with a specific Frequency Range (e.g., FR1, FR2, FR3, FR4), a band, a band combination, a component carrier (CC), and may be configured simultaneously to a UE operating in multiple such FRs, bands, band combinations, or CCs. The UE may operate to measure positioning signals according to different operating modes. For example, according to a first operating mode, the UE may measure positioning signals only during the active times of the respective DRX groups. Also or alternatively, according to a second operating mode, the UE may measure positioning signals of the second DRX group outside of the typical active time (e.g., with a variable active time that may add to the typical active time, e.g., by extending the typical active time and/or initiating a further active time portion) of the second DRX group. The UE may implement the second operating mode under various conditions, such as being configured to do so as a default, by receiving information causing the UE to change the operating mode, such information possibly including positioning signal configuration information (e.g., indicating aperiodic positioning signal reception is possible), an aperiodic (unscheduled) positioning signal, and/or an aperiodic positioning information report request. Other configurations, however, may be used.

Items and/or techniques described herein may provide one or more of the following capabilities, as well as other capabilities not mentioned. Power may be saved measuring positioning signals by implementing different discontinuous reception parameters, e.g., for different frequency ranges. Multiple discontinuous reception groups may be implemented to facilitate data reception while reducing power consumption relative to multiple discontinuous reception groups with similar active times. Important positioning methods may be measured for discontinuous reception groups while conserving power consumption. Power consumption may be adjusted to accommodate positioning signal measurement based on one or more further criteria such as importance of positioning signal measurement and/or timing of positioning signal reception. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, asset tracking, locating a friend or family member, etc. Existing positioning methods include methods based on measuring radio signals transmitted from a variety of devices including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. The BSs 110a, 110b, 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more of the BSs 110a, 110b, 114 may be configured to communicate with the UE 105 via multiple carriers. Each of the BSs 110a, 110b, 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although only one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the BSs 110a, 110b, 114 and/or the network 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples only as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the BSs 110a, 110b, 114, the core network 140, and/or the external client 130. For example, such other devices may include internet of thing (IoT) devices, medical devices, home entertainment and/or automation devices, etc. The core network 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g. the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The BSs 110*a*, 110*b*, 114 may each comprise one or more TRPs. For example, each sector within a cell of a BS may comprise a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the BSs 110*a*, 110*b*, 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematics (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120). The AMF 115 may serve as a control node that processes signaling between the UE 105 and the core network 140, and may provide QoS (Quality of Service) flow and session management. The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS transmissions from the gNBs 110*a*, 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time Of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
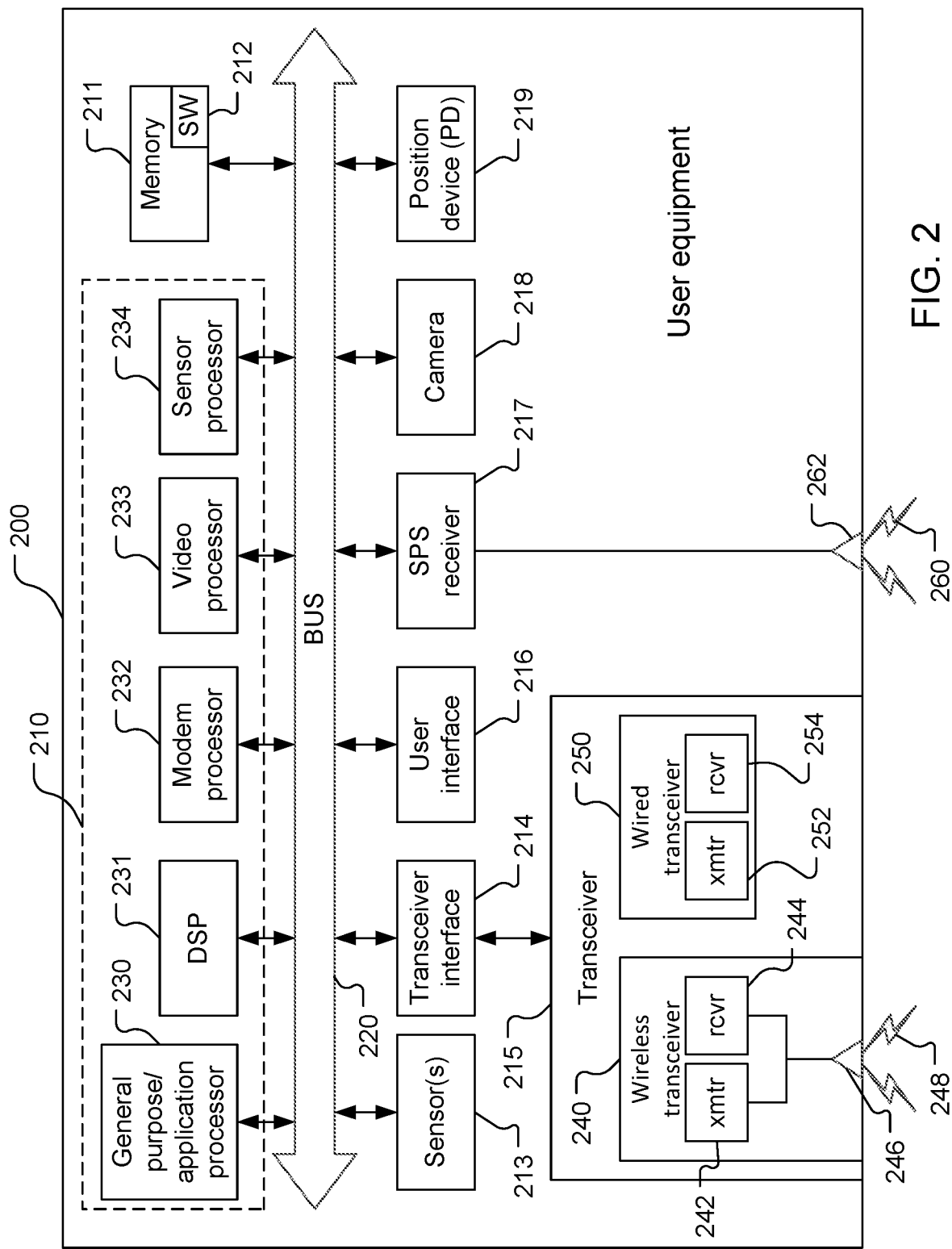
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., with the network 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer only to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general purpose/application processor 230, the transceiver 215, the SPS receiver 262, and/or another component of the UE 200, and may be provided by hardware, software, firmware, or various combinations thereof.

Figure 3:
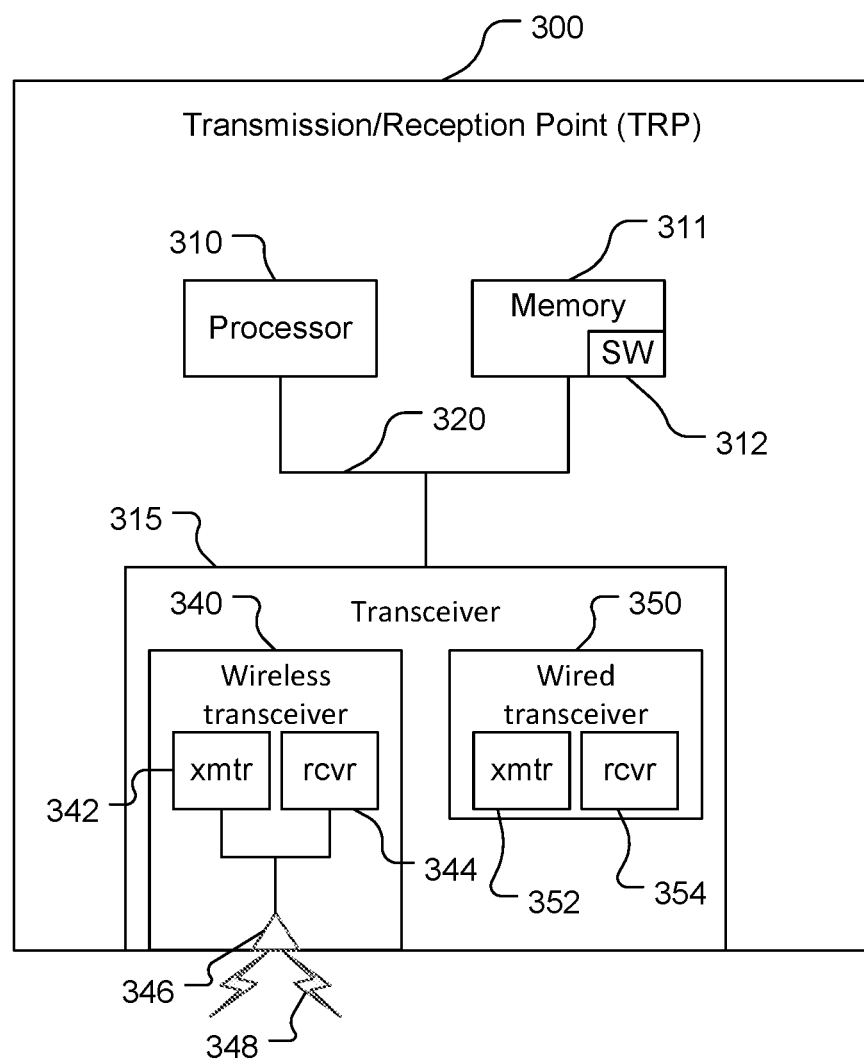
FIG. 3 is a block diagram of components of an example transmission/reception point shown in FIG. 1.

Referring also to FIG. 3, an example of a TRP 300 of the BSs 110a, 110b, 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer only to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the BSs 110a, 110b, 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the network 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
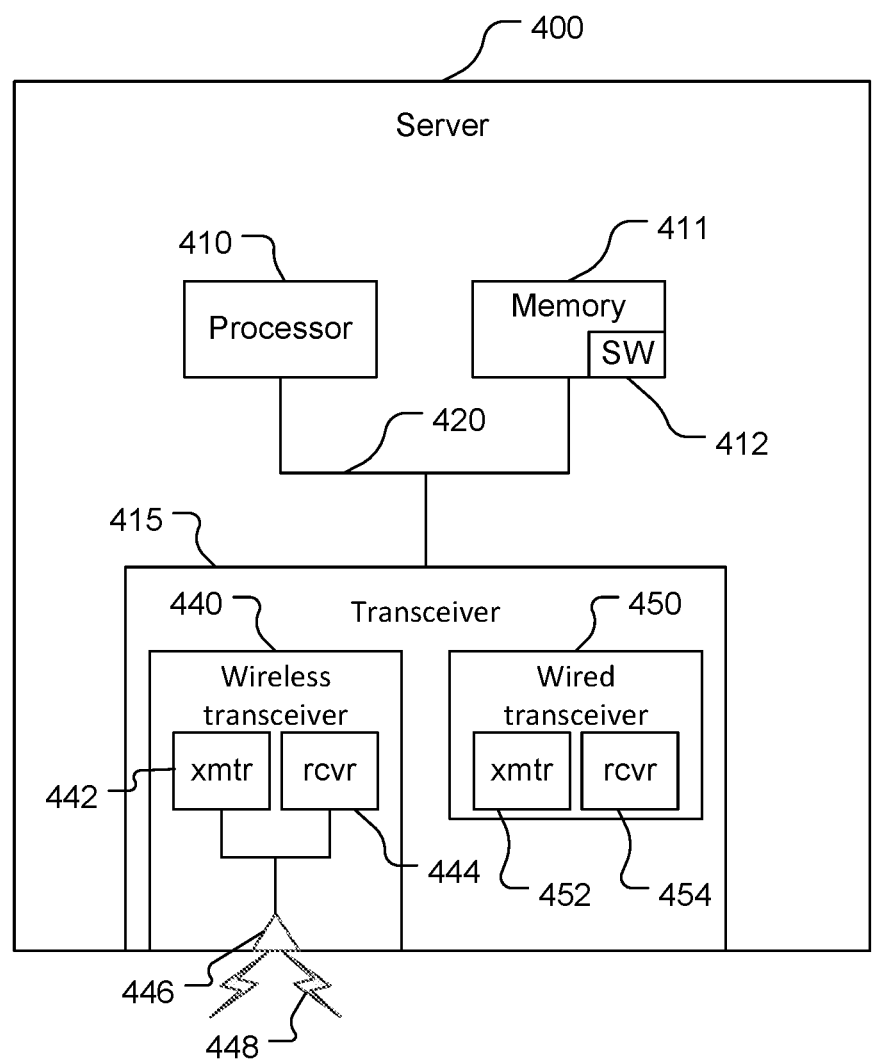
FIG. 4 is a block diagram of components of an example server shown in FIG. 1.

Referring also to FIG. 4, a server 400, which is an example of the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the network 135 to send communications to, and receive communications from, the TRP 300, for example, and/or one or more other entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer only to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that only the UEs subscribed to the service can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or wardriving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE $T_{RX-TX}$ or $UE_{RX-TX}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message (s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS), may refer to one reference signal or more than one reference signal.

Positioning reference signals (PRS) include downlink PRS (DL PRS) and uplink PRS (UL PRS) (which may be called SRS (Sounding Reference Signal) for positioning). PRS may comprise PRS resources or PRS resource sets of a frequency layer. A DL PRS positioning frequency layer (or simply a frequency layer) is a collection of DL PRS resource sets, from one or more TRPs, that have common parameters configured by higher-layer parameters DL-PRS-Positioning-FrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element).

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that may be in multiple Resource Blocks (RBs) within N (one or more) consecutive symbol(s) within a slot. An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Discontinuous Reception

Discontinuous reception (DRX) is a mechanism in which a UE operates intermittently in a sleep mode and an active mode. The UE may enter the sleep mode from the active mode and stay in the sleep mode for a predetermined amount of time, although the time in the sleep mode may be altered, e.g., before entering the sleep mode or while in the sleep mode. The sleep mode time may be altered dynamically or in a predetermined way (e.g., according to a schedule of different sleep times). The UE may enter the active mode by waking up from the sleep mode. In "normal," non-DRX operation, the UE is in the active mode at all times and monitors a PDCCH (Physical Downlink Control CHannel) for every subframe or slot or monitoring instance as the UE is unaware of when the network will transmit data for the UE. This non-DRX operation may consume more power than is desired and, for example, cause the UE to require charging more than desired or lack power to run one or more desired functions.

The DRX active time is the time during which the UE is monitoring the PDCCH. The active time includes times that: an ON duration timer is running; a DRX inactivity timer is running; a DRX retransmission timer is running; a MAC (Media Access Control) contention resolution timer is running; a scheduling request has been sent on PUCCH (Physical Uplink Control CHannel) and is pending; an uplink grant for a pending HARQ (Hybrid Automatic Repeat reQuest) retransmission may occur and there are data in a corresponding HARQ buffer; a PDCCH (communication) indicates a new transmission addressed to a C-RNTI (Cell-Radio Network Temporary Identity) of the UE has not been received after successful reception of an RAR (Random Access Response) for the preamble not selected by the UE; and in a non-contention based RA (Routing Area), until a PDCCH indicating a new transmission to the C-RNTI of the UE is received.

The UE typically receives a DRX configuration from the serving cell or serving TRP of the UE. The DRX configuration may include parameters of a DRX cycle, a DRX ON duration timer, a DRX inactivity timer, a DRX retransmission timer, a short DRX cycle, and a DRX short cycle timer. The DRX cycle parameter indicates a duration of one ON time (active time, i.e., time in active mode) and one OFF time (sleep time, i.e., time in sleep mode). The DRX cycle may not be specified in a Radio Resource Control (RRC) signal, but be calculated from the subframe or slot time and a long DRX cycle start offset. The DRX ON duration timer indicates the duration of the ON time within one DRX cycle. The DRX inactivity timer indicates how long the UE should remain ON after reception of a PDCCH communication. This may extend the UE ON period into a time when the UE would be OFF had the UE not received the PDCCH communication. The DRX retransmission timer indicates a maximum number of consecutive PDCCH subframes or slots or monitoring instances during which the UE should remain active (ON) to wait for an incoming retransmission after a first available retransmission time. The DRX short cycle is a DRX cycle that can be implemented within the OFF time of a long DRX cycle. The DRX short cycle timer indicates a consecutive number of subframes or slots that follow the short DRX cycle after the DRX inactivity timer has expired.

Discontinuous reception may affect reference signal measurement. For NR, if the UE is configured with DRX, then the UE may not measure CSI-RS (Channel State Information-Reference Signal) resources other than during the active time based on CSI-RS-Resource-Mobility. Further, if the DRX cycle is longer than 80 ms, then the UE may not expect CSI-RS resources are available other than during the active time based on CSI-RS-Resource-Mobility. Otherwise, the UE may assume that CSI-RS are available for measurement based on CSI-RS-Resource-Mobility. For NR, regarding CSI acquisition and feedback, with DRX configured, the UE may report a CSI report only if the UE receives at least one CSI-RS transmission occasion for channel measurement and a CSI-RS and/or CSI-IM (CSI-Interference Measurement) occasion in the active time no later than the CSI reference resource and may drop the report otherwise. The most recent CSI measurement occasion occurs in the DRX active time for CSI to be reported. For LTE, the UE is expected to measure outside the active DRX time, e.g., to fulfill requirements of an LPP (LTE Positioning Protocol) request.

Multiple DRX Groups

Multiple DRX groups may be configured for a single UE. Different DRX groups may have one or more different parameters. For example, different DRX groups may correspond to the same frequency range or different frequency ranges, may have different DRX inactivity timers, and/or may have different DRX ON duration timers. For example, by having a shorter DRX ON duration for a higher-frequency band, e.g., a mm-wave band versus a sub-6 GHz band, less power may be consumed for the higher-frequency band. With sleep times of the higher-frequency band saving power, it may be desirable to receive data using the lower-frequency band, which may have a longer DRX ON duration and shorter sleep durations. If an environment of the UE is very data demanding, then the higher-frequency band may be used to receive data, and sleep times for the higher-frequency band may be reduced. A lower-frequency band, e.g., a sub-6 GHz band, may be used as a primary band, e.g., for cell communication, and a higher-frequency band, e.g., a mm-wave band, may be used as a secondary band, e.g., for receiving data but not transmitting data.

The UE may be configured with one or more DL PRS resource set configurations indicated by higher-layer parameters DL-PRS-Resource Set and DL-PRS-Resource. Each DL PRS resource set includes one or more DL PRS resources each having an associated spatial transmission filter. The UE may be configured with one or more DL PRS positioning frequency layer configurations indicated by a higher-layer parameter DL-PRS-PositioningFrequency-Layer.

UE Modes

Figure 5:
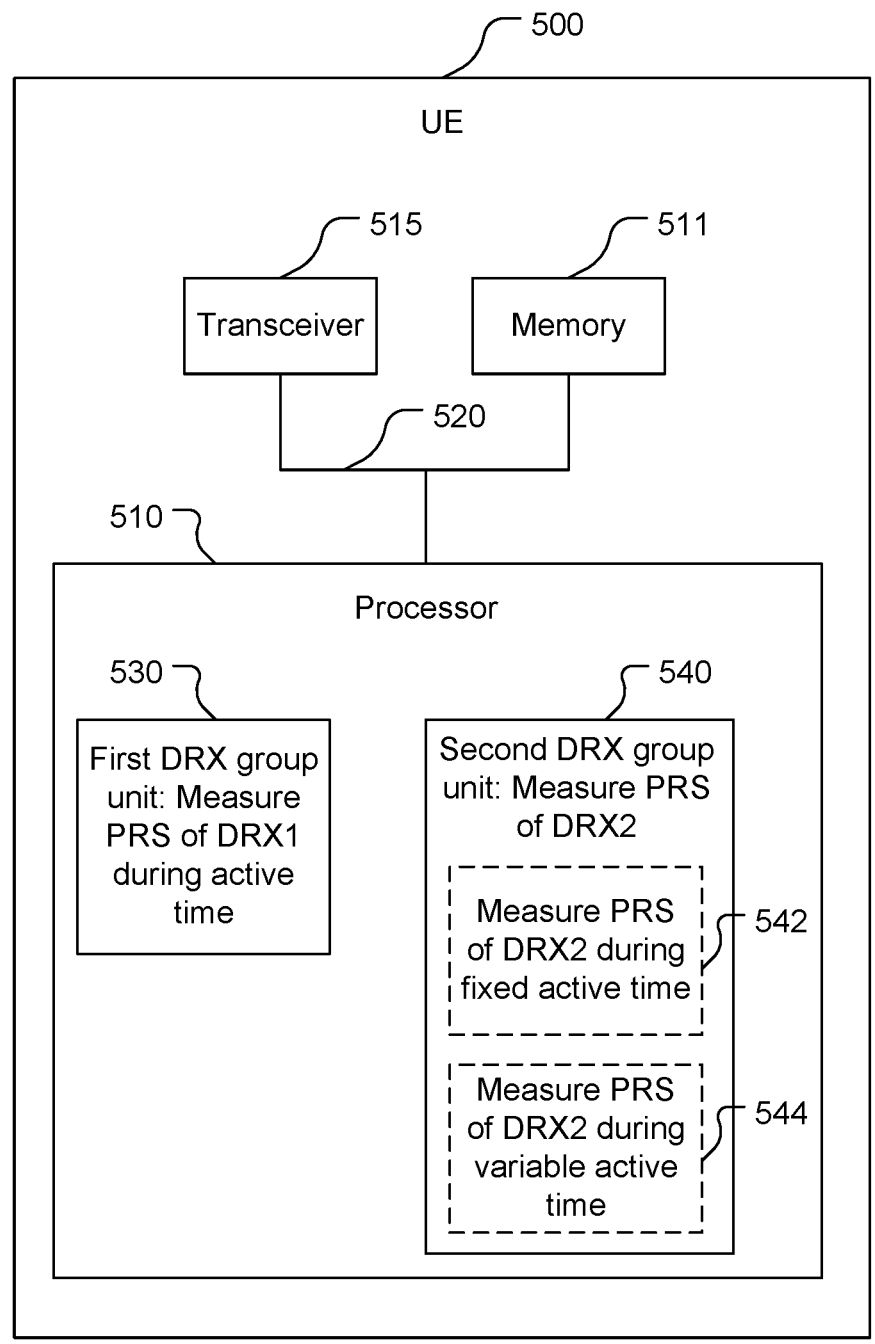
FIG. 5 is a simplified block diagram of an example user equipment.
Figure 6:
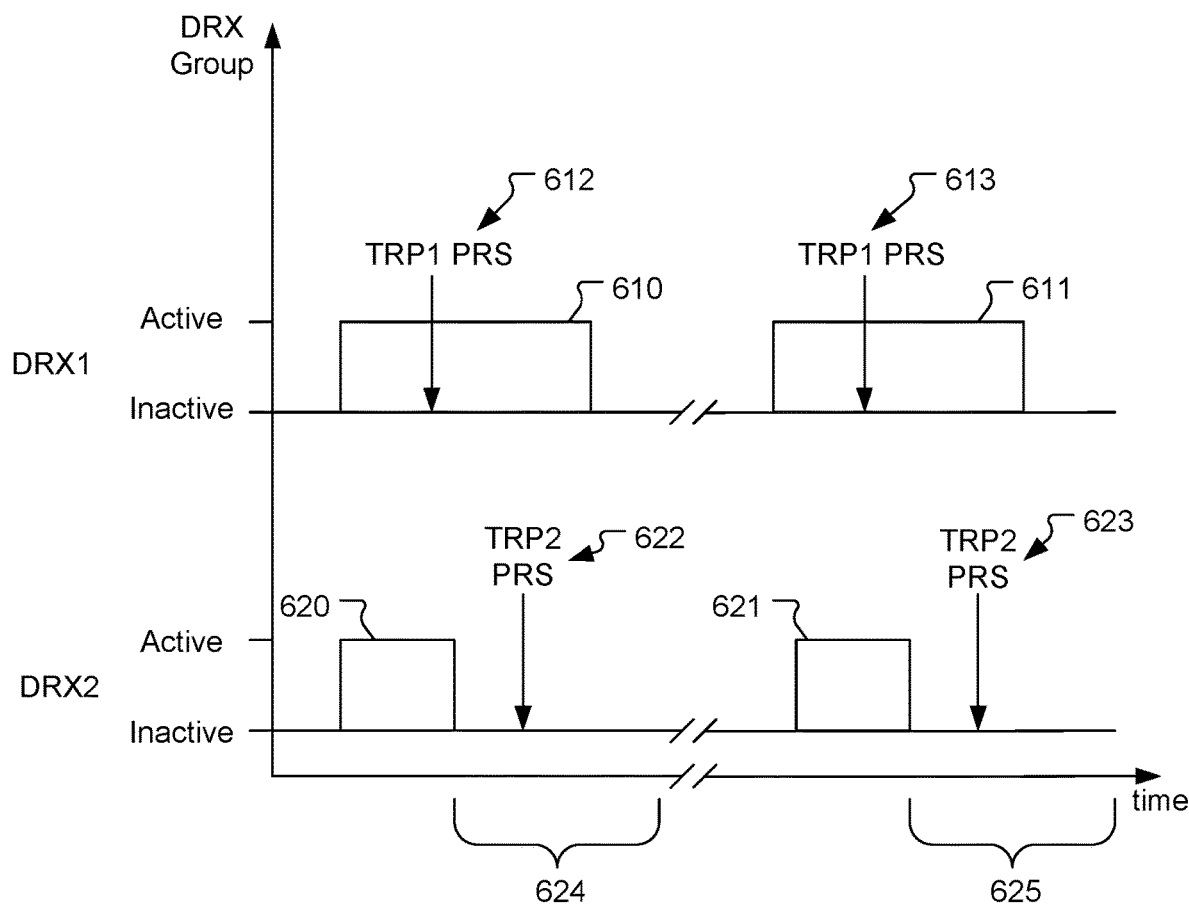
FIG. 6 is an example timing diagram of positioning signals received during active and inactive times for fixed-active-time mode discontinuous reception cycles.

A UE may be configured to operate in accordance with one or more of multiple operating modes for measuring positioning signals (e.g., PRS resources and/or PRS resource sets) and reporting positioning information based on the positioning signal measurements. Positioning signal information may comprise one or more positioning signal measurements and/or information derived from one or more positioning signal measurements, e.g., a position of the UE. Referring to FIG. 5, with further reference to FIG. 2, a UE 500 includes a processor 510, a memory 511, and a transceiver 515 all communicatively coupled to each other by a bus 520. The UE 500 may include some or all of the components shown in FIG. 5, and may include one or more other components such as any of those shown in FIG. 2 such that the UE 200 may be an example of the UE 500. While the description herein refers to the processor 510 (or the UE) being configured to perform various functions, this includes the processor 510 working in conjunction with the memory 511 and/or the transceiver 515 as appropriate to perform the function(s). The processor 510 includes a first DRX group unit 530 configured to measure PRS of a first DRX group, here called DRX1, and a second DRX group unit 540 configured to measure PRS of a second DRX group, here called DRX2. The processor 510 is configured to operate in at least one of multiple UE operating modes, here a fixed-active-time mode and/or a variable-active-time mode, with the second DRX group unit 540 configured to include a fixed-time unit 542 configured to measure PRS of the second DRX group DRX2 within a fixed active time, e.g., only during active times of the second DRX group, and/or configured to include a variable-time unit 544 configured to implement a variable active time that may be adjusted for measuring the PRS of the second DRX group DRX2 as appropriate (e.g., as discussed further herein). The first DRX group DRX1 has a longer default active time than the second DRX group DRX2. The first DRX group DRX1 may be in a lower or higher frequency range than the second DRX group DRX2, may be in the same or different frequency layer, etc. In the examples discussed, there are two DRX groups, but more than two DRX groups may be implemented by the UE 500.

In the fixed-active-time mode the UE 500 is configured to measure PRS that is(are) received inside of the active time of the DRX groups. Thus, referring also to FIG. 6, the UE 500 is configured to measure PRS of DRX1 during active times 610, 611 (other active times are not shown) and to measure PRS of DRX2 during active times 620, 621 (with further active times not shown). While the active times 610, 611 are shown beginning at the same times as the active times 620, 621, the active times of the different DRX groups may not start at the same times. In this example, DRX1 is in a first frequency range (e.g., FR1 from 663 MHz to 5.0 GHz) and a first frequency layer (FL1) and DRX2 is in a second frequency range (e.g., FR2 from 24.25 GHz to 40.0 GHz) and a second frequency layer (FL2), and the active times 610, 611 are longer than the active times 620, 621, but other parameters of the DRX groups may be variable (e.g., which frequency range is higher, what parameter values exist in the frequency layers, etc.). A PRS 612, 613 from a first TRP, called TRP1, is scheduled for periodic transmission and is received during the active times 610, 611 of the first DRX group DRX1 by the UE 500. In FIGS. 6-13, downward pointing arrows indicate signals inbound to (received by) a UE and upward pointing arrows indicate signals outbound from (sent from) a UE. The processor 510 measures the PRS from TRP1 (listens for, receives, and determines one or more characteristics of the PRS, e.g., receive power, time of arrival, angle of arrival, etc.). A PRS 622, 623 from a second TRP, called TRP2, is received outside of the active times 620, 621 (during inactive times 624, 625 of the second DRX group DRX2). In this example, with the UE 500 in the fixed-active-time mode and the TRP2 PRS 622, 623 received in the inactive times 624, 625, the UE 500 would not report an RSTD measurement regarding TRP1 and TRP2 as the processor 510 would not determine time of arrival for the TRP2 PRS. The processor 510 may be configured to report to the server 400 (e.g., an LMF) that the PRS resource or PRS resource set arrives or is scheduled to arrive outside of the active time of the second DRX group and/or that the frequency layers FL1, FL2 are different (e.g., that the second frequency layer FL2 is on a different DRX group than the first frequency layer FL1). The server 400 may be configured to respond to such indication(s) from the UE 500 by reconfiguring PRS, e.g., to another frequency layer, another time, another frequency, etc., so that the UE 500 will measure the PRS from both TRPs and report an RSTD. For example, the server 400 could reconfigure the PRS 622, 623 from TRP2 to a different time relative to the active time of DRX2, e.g., so that PRS from both DRX groups are measured.

Figure 7:
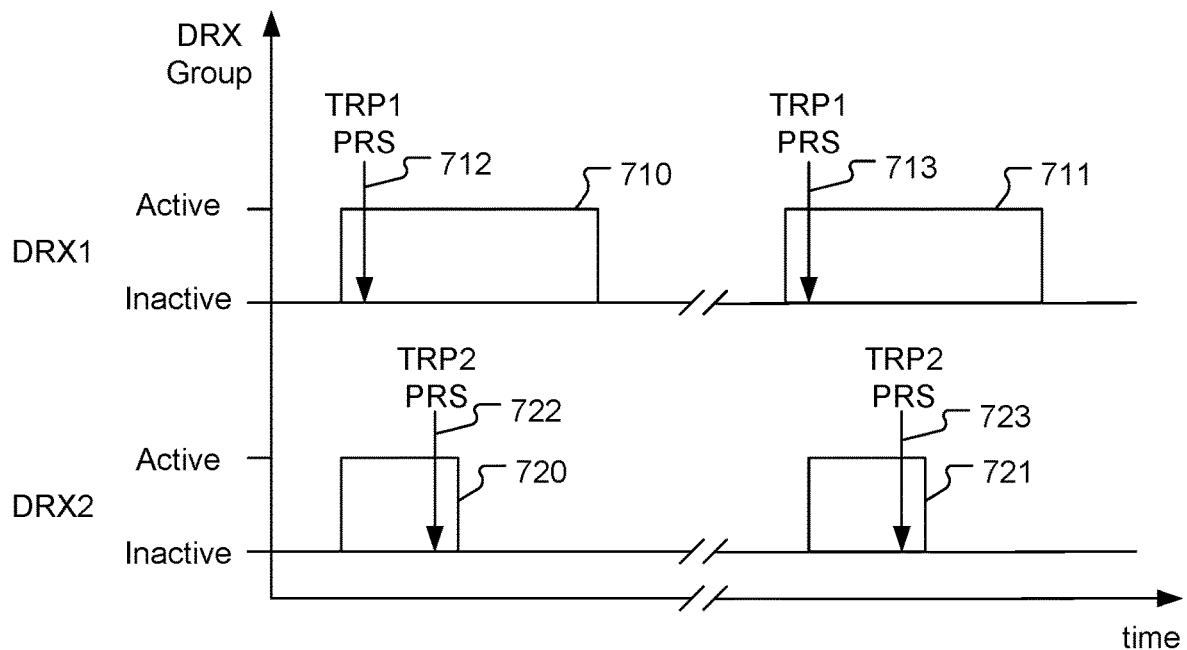
FIG. 7 is an example timing diagram of positioning signals received during active times for fixed-active-time mode discontinuous reception cycles.

Referring also to FIG. 7, in the fixed-active-time mode, the UE 500 is configured and expected to report positioning information (e.g., PRS measurements such as RSTD measurements, UE position, etc.) if both (in this example, with two DRX groups) are received during respective active times of the DRX groups. In this example, PRS 712, 713 from TRP1 arrive at the UE 500 within active times 710, 711 of the first DRX group, respectively, and PRS 722, 723 from TRP2 arrive at the UE 500 within active times 720, 721 of the second DRX group, respectively. The processor 510 is configured to determine time of arrival of the PRS 712, 713, 722, 723 and provide RSTD for TRP1, TRP2 based on measurements of the PRS 712, 713, 722, 723.

Figure 8:
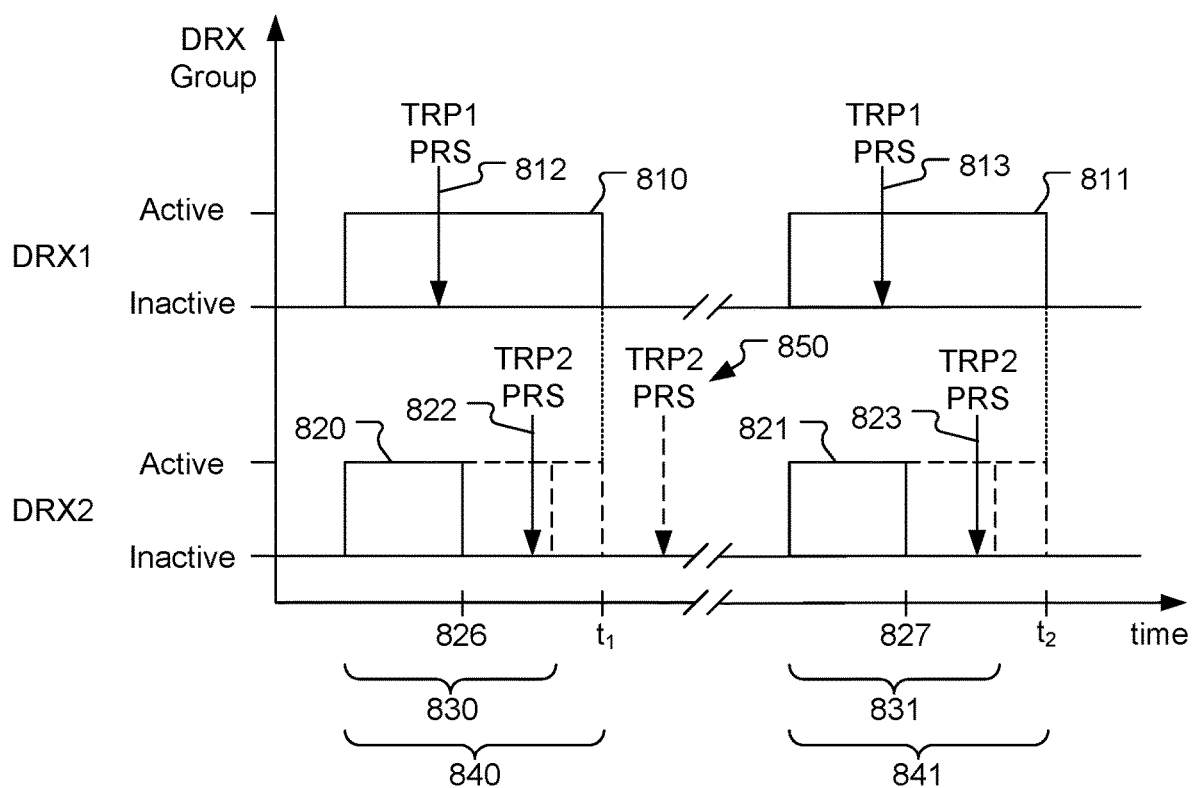
FIG. 8 is an example timing diagram of positioning signals received during active and inactive times for variable-active-time mode discontinuous reception cycles.

Referring also to FIG. 8, in the variable-active-time mode, the UE 500 is configured and expected to report positioning information if at least one PRS is received within a respective active time. As shown, PRS 812, 813 from TRP1 arrive during respective active times 810, 811 and the UE 500 (e.g., the processor 510) is configured to measure the PRS 812, 813. As further shown, PRS 822, 823 from TRP2 arrive after expiration of (i.e., after ends 826, 827) of active times 820, 821, respectively. The processor 510 may be aware of the expected arrival times of the PRS 822, 823 as the arrival times (or at least transmission times of the PRS 822, 823) are scheduled and known by the UE 500, e.g., from one or more PRS configuration messages provided by the server 400. Being aware that the PRS 812, 813 will arrive within the active times 810, 811 of the first DRX group DRX1, in the variable-active-time mode the processor 510 is configured to (i.e., may) adjust active times for measuring the positioning signals. The processor 510 may cause the UE 500 to be in active mode during one or more times that are outside of the active times 820, 821 (e.g., to be active during one or more times that the UE 500 would be inactive under a default condition). The UE 500, in particular the unit 544, implements a variable-active-time mode in which an active time for measuring positioning signals (e.g., PRS) in the second DRX group is variable. The variable active times include the active times 820, 821 and may include further time that may be contiguous with the active times 820, 821, e.g., extending the active times 820, 821 to active times 830, 831 that include the arrival times of the PRS 822, 823 such that the processor 510 can measure the PRS 822, 823. The processor 510 may extend the active times 820, 821 up to ends, e.g., end times $t_1$, $t_2$, of the active times 810, 811 of the first DRX group, to form active times 840, 841. A PRS 850 that arrives after the end time $t_1$, however, will not be measured. The variable time(s) may be discontiguous, comprising a combination of multiple discrete (separate) active time portions (e.g., see FIG. 13 and related discussion), with the variable active time of the second DRX group ending no later than an end of the active time for the first DRX group. The processor 510 may enter the sleep mode (inactive mode) once the PRS 822, 823 are received, terminating the active mode in response to receipt of the PRS 822, 823, or may schedule the length of the extended active time based on the expected (e.g., scheduled) arrival time (e.g., transmission time plus some travel time, and possibly a safety margin of time) of the PRS 822, 823. The processor 510 may measure the PRS 812, 813, 822, 823 and provide positioning information, e.g., measurement information such as arrival times, processed measurement information such as RSTD or UE position, etc.

Various types of positioning information may be determined and provided by the UE 500 based on one or more measured positioning signals, here PRS (e.g., PRS resources, PRS resource sets). For example, the processor 510 may be configured to determine RSTD across multiple (e.g., two) TRPs, RSTD across multiple frequency layers, RSTD across PRS resources on different frequency layers, and/or RSTD across PRS resource sets on different frequency layers. As another example, the processor 510 may be configured to determine a position estimate for the UE 500 (using one or more known positioning techniques such as those discussed above) based on positioning signal measurements. As another example, the processor 510 may be configured to determine a reference signal receive power (RSRP) (e.g., power of received PRS) across multiple beams, RSRP across multiple PRS resources, and/or RSRP across multiple TRPs. As another example, the processor 510 may be configured to determine a UE Rx-Tx which is the time difference between the time of arrival (ToA) of a signal (e.g., PRS) and the transmission time (time of departure, ToD) of a response message (e.g., an SRS for positioning). The UE Rx-Tx may be used as part of an RTT calculation for determining position of the UE 500.

Figure 9:
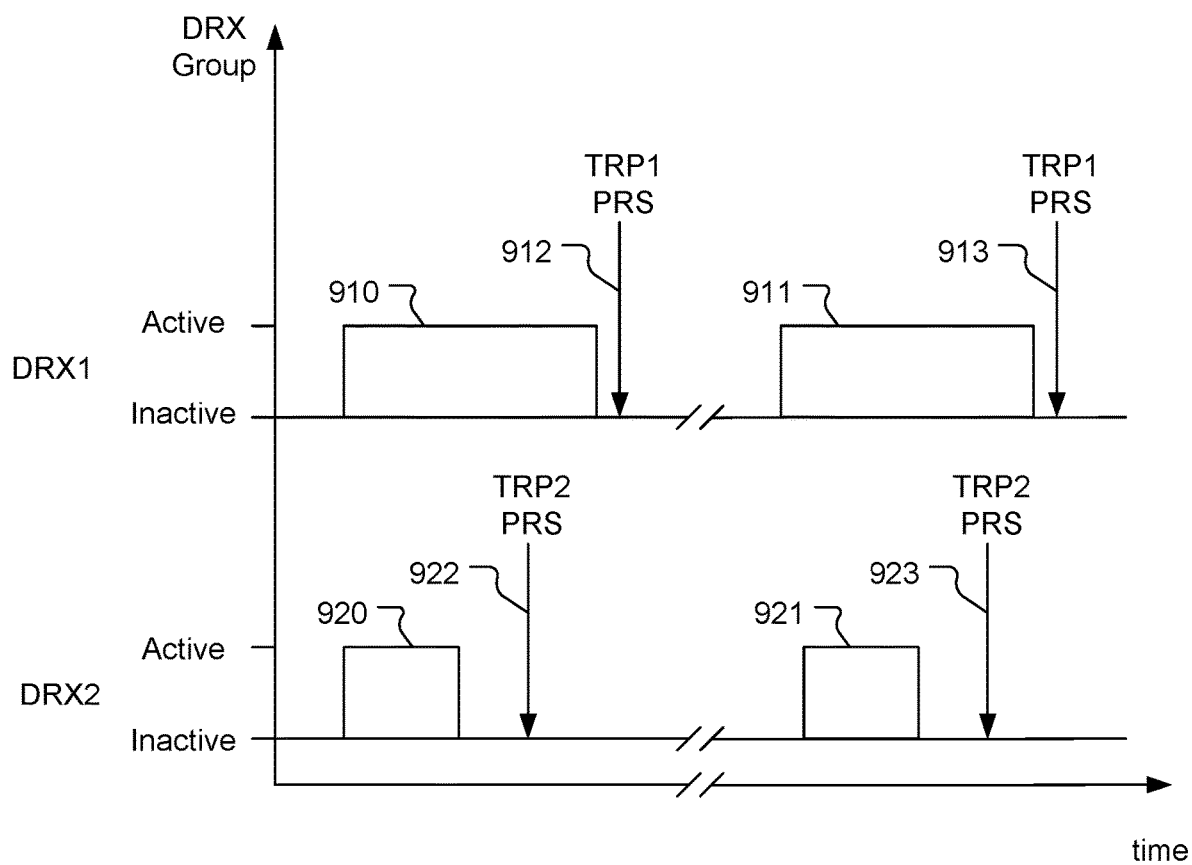
FIG. 9 is an example timing diagram of positioning signals received during inactive times for variable-active-time mode discontinuous reception cycles.

Referring also to FIG. 9, in the variable-active-time mode, the UE 500 is configured and expected not to report positioning information if no PRS is received within a respective active time of any (in this example, either) DRX mode (i.e., all PRS arrive outside of respective active times). As shown, PRS 912, 913 from TRP1 and PRS 922, 923 from TRP2 arrive outside of active times 910, 911, 920, 921, respectively. In this case, the UE 500 would not measure the PRS 912, 913, 922, 923 or report positioning information based on measurements of the PRS 912, 913, 922, 923.

Which mode the UE 500 operates in may be determined based on one or more factors. For example, the UE behavior may be based on a time behavior of one or more positioning signals and/or positioning reporting. For example, the operating mode of the UE 500 may be based on time behavior of PRS resources and/or PRS measurement reporting. For example, if the UE 500 expects aperiodic (unscheduled) triggering of positioning information reporting or is aperiodically triggered by DCI (Downlink Control Information) to report positioning information, then the UE 500 may be expected to operate according to the variable-active-time mode. The UE 500 may be configured, e.g., according to configuration information received from the server 400, to expect aperiodic triggering to report positioning information. The potential for aperiodic triggering of positioning information reporting indicates that the positioning information is important. Also or alternatively, the UE 500 may be aperiodically triggered to report positioning information even if the UE 500 did not expect aperiodic triggering, with an aperiodic report request in a first DRX group indicating for the UE 500 to expect to receive a positioning signal in a second DRX group. Thus, the UE 500, e.g., the processor 510, may be configured to change from the fixed-active-time mode to the variable-active-time mode in response to receiving an aperiodic request to report positioning information.

This could mean changing from sleep (inactive) mode to active mode, i.e., starting a new, unplanned, active time for measuring a positioning signal. Also or alternatively, the UE 500 (e.g., the processor 510) may be configured to be aperiodically triggered by a positioning signal. The processor 510 may be configured to respond to an aperiodic reception (at an unscheduled time) of a positioning signal by implementing (e.g., changing to) the variable-active-time mode. Thus, if a positioning signal is aperiodically received by a first DRX group during an active time of the first DRX group, then the processor 510 may implement the variable-active-time mode, changing to this mode as appropriate.

Figure 10:
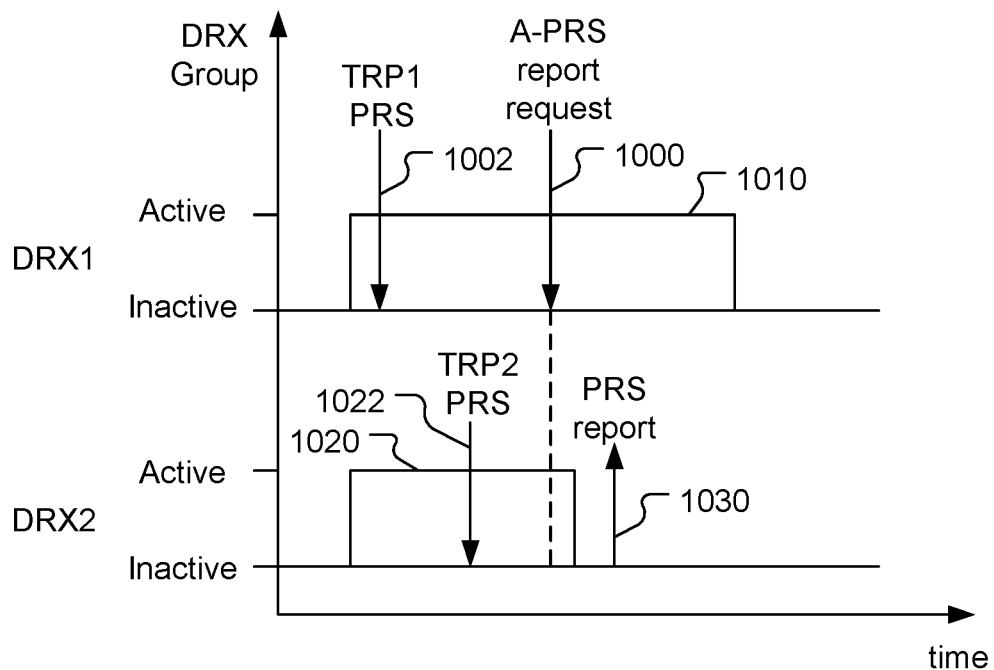
FIG. 10 is an example timing diagram of positioning signals received during active times for fixed-active-time mode or variable-active-time mode discontinuous reception cycles, and a report request received during the active times.
Figure 11:
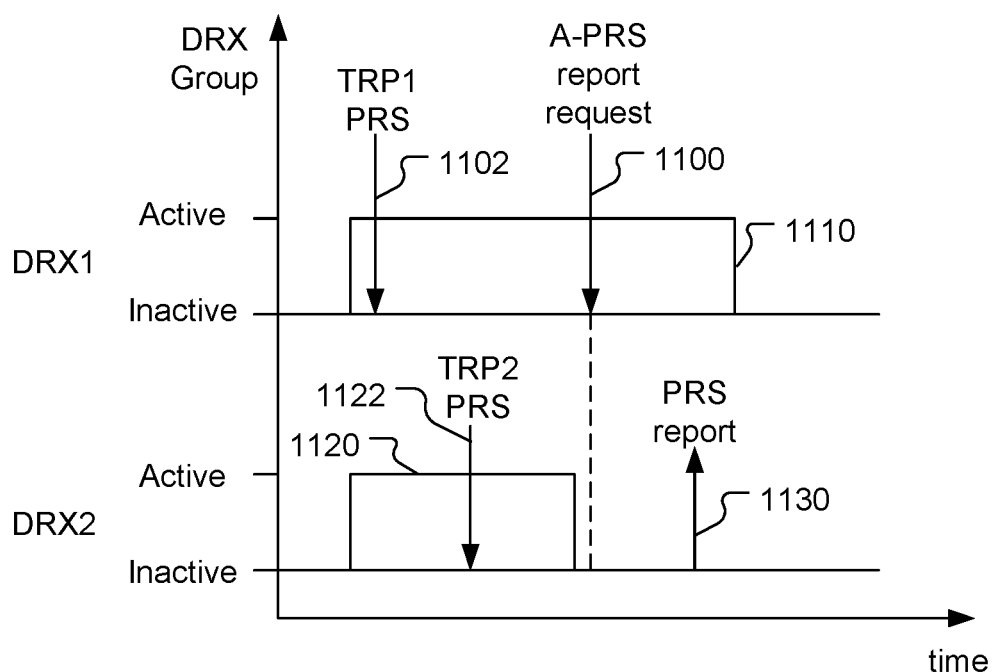
FIG. 11 is an example timing diagram of positioning signals received during active times for fixed-active-time more or variable-active-time mode discontinuous reception cycles, and a report request received during the active time of one reception cycle and during an inactive time of another reception cycle.
Figure 12:
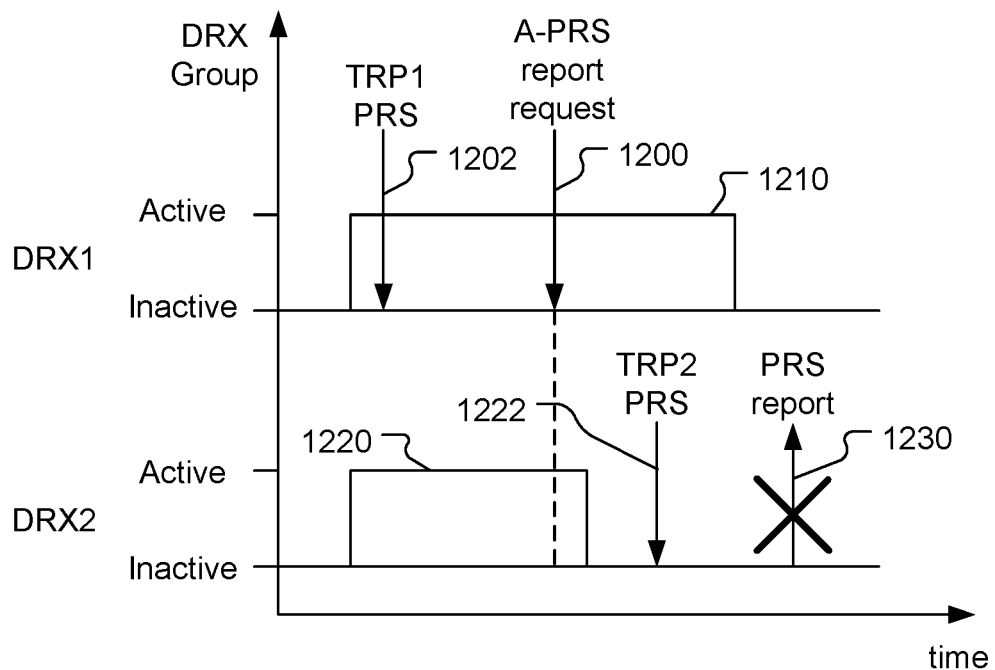
FIG. 12 is an example timing diagram of a fixed-active-time mode with one positioning signal received during an active time of one discontinuous reception cycle, another positioning signal received during an inactive time of another discontinuous reception cycle, and a report request received during the active times of the discontinuous reception cycles.
Figure 13:
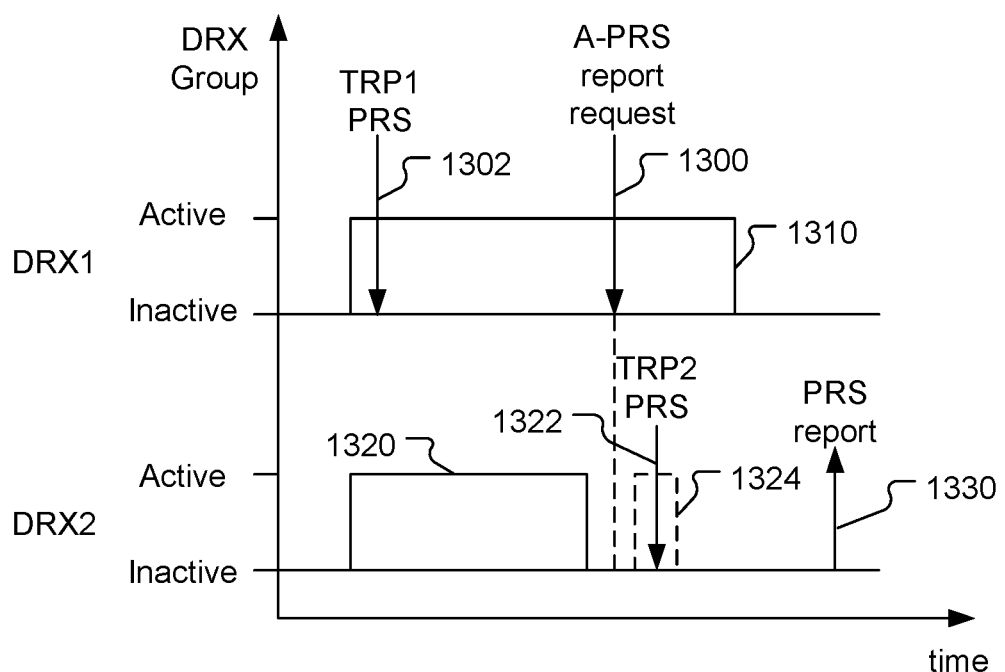
FIG. 13 is an example timing diagram of a variable-active-time mode with one positioning signal received during an active time of one discontinuous reception cycle, a report request received before reception of another positioning signal scheduled for an inactive time of another discontinuous reception cycle, and reception of the other positioning signal during a variable active time of the other discontinuous reception cycle.

Referring to FIGS. 10-13, with further reference to FIGS. 1-5, various scenarios involving aperiodic report requests are shown. The scenarios are based on timing of an aperiodic positioning trigger (here, and A-PRS request), on a component carrier of DRX1, a PRS measurement occasion on the component carrier of DRX2, and timing of the trigger with respect to the active time of DRX2. In FIG. 10, an aperiodic report request 1000 and a PRS 1002 are received during an active time 1010 of DRX1, and a PRS 1022 is received during an active time 1020 of DRX2, with the aperiodic report request 1000 also being received during the active time 1020 of DRX2. In either the fixed-active-time mode or the variable-active-time mode, the UE 500 would measure the PRSs 1002, 1022 and thus would respond to the report request 1000 by sending a positioning information report, here a PRS report 1030 (e.g., to the server 400 via the TRP 300). In FIG. 11, an aperiodic report request 1100 and a PRS 1102 are received during an active time 1110 of DRX1, and a PRS 1122 is received during an active time 1120 of DRX2, with the aperiodic report request 1100 being received after the active time 1120 of DRX2 expires. In either the fixed-active-time mode or the variable-active-time mode, the UE 500 would measure the PRSs 1102, 1122 and thus would respond to the report request 1100 by sending a positioning information report, here a PRS report 1130 (e.g., to the server 400 via the TRP 300). In FIG. 12, an aperiodic report request 1200 and a PRS 1202 are received during an active time 1210 of DRX1, and a PRS 1222 is received after an active time 1220 of DRX2 expires, with the aperiodic report request 1200 being received during the active time 1220 of DRX2. In the fixed-active-time mode, as illustrated in FIG. 12, the UE 500 would not measure the PRS 1222 and thus would not respond to the report request 1200 by sending a positioning information report, here a PRS report 1230 (e.g., to the server 400 via the TRP 300). That is, as indicated, the UE 500 would not send the PRS report 1230. In FIG. 13, PRS and an aperiodic report request are received with similar timing (with respect to active times of DRX1 and DRX2) as with FIG. 12, but the UE 500 is either in, or changes to, the variable-active-time mode. As shown in FIG. 13, an aperiodic report request 1300 and a PRS 1302 are received during an active time 1310 of DRX1, and a PRS 1322 is received after an active time 1320 of DRX2 expires, with the aperiodic report request 1300 being received after the active time 1320 of DRX2 expires. The UE 500 (e.g., the processor 510) is configured to change to the variable-active-time mode in response to receiving the aperiodic report request 1300, and thus to initiate another active time portion 1324, during which the UE 500 measures the PRS 1322. In this case, the UE 500 effectively extends the active time 1320 by initiating the active time portion 1324, with the active time 1320 and the active time portion 1324 each comprising active time portions that in combination comprise the active time for measuring the second positioning signal. The UE 500 would thus respond to the report request 1300 by sending a positioning information report, here a PRS report 1330 (e.g., to the server 400 via the TRP 300). The PRS report 1330 may be sent by the UE 500 closer (or further) in time relative to the receipt and measurement of the PRS 1322 than implied by the separation of the PRS 1322 and the PRS report 1330 shown FIG. 13.

Operation

Figure 14:
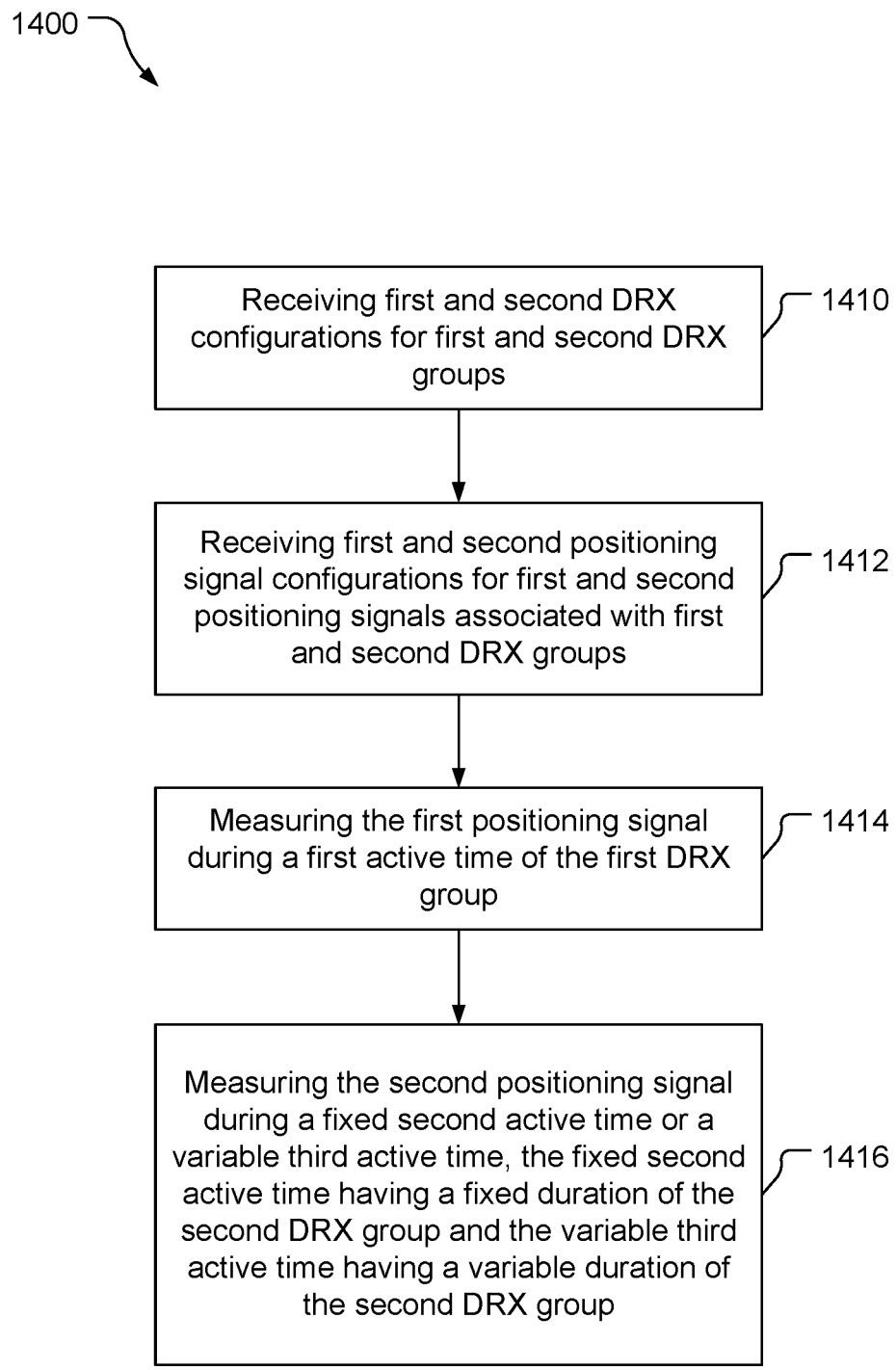
FIG. 14 is a block flow diagram of a method of performing positioning operations at a user equipment.

Referring to FIG. 14, with further reference to FIGS. 1-13 and 15, a method 1400 of performing positioning operations at a UE includes the stages shown, with a signal and processing flow 1500 (FIG. 15) showing communications between the UE 500 (e.g., the UE 200), the server 400 (e.g., an LMF), and two TRPs 300-1, 300-2, and processing by the UE 500 to implement the method 1400. The method 1400 is, however, an example only and not limiting. The method 1400 may be altered, e.g., by having stages added, removed, rearranged, combined, performed concurrently, and/or having single stages split into multiple stages.

At stage 1410, the method 1400 includes receiving, at the UE, a first discontinuous reception (DRX) configuration for a first DRX reception group and a second DRX configuration for a second DRX reception group. For example, the TRP 300-1 is a serving TRP for the UE 500 and sends DRX configuration information to the UE 200 in a message 1510. The DRX configuration information may include, for example, the DRX cycle, DRX ON duration timer, DRX inactivity timer, DRX retransmission timer, short DRX cycle, and DRX short cycle timer for each of two frequency ranges for reception of PRS from the TRPs 300-1, 300-2. Thus, the processor 510, in combination with the transceiver 515 (e.g., the wireless receiver 244) and possibly in combination with the memory 511 (e.g., the software 212), may comprise means for receiving the DRX configurations.

At stage 1412, the method 1400 includes receiving, at the UE, a first positioning signal configuration for a first positioning signal associated with the first DRX group and a second positioning signal configuration for a second positioning signal associated with the second DRX group. The positioning signals may be explicitly or implicitly associated with respective DRX groups. For example, a positioning signal may be implicitly associated with a DRX group by having the positioning signal have a frequency that is part of a component carrier band, a band combination, or frequency range of (e.g., assigned to) the DRX group, or both of the first and second positioning signals may be implicitly associated with respective DRX groups. For example, the server 400 may send PRS configuration information to the UE 500 in a message 1512. The PRS configuration information may be sent directly from the server 400 to the UE 500 or via one or more intermediaries, such as the TRP 300-1. The PRS configuration information may include, for example, scheduled timing of periodic PRS, periodicity, slot offset, bandwidth offset, number of ports, repetition factor, number of PRS symbols within a slot, and/or whether to expect aperiodic PRS and/or aperiodic report requests. The processor 510, in combination with the transceiver 515 (e.g., the wireless receiver 244) and possibly in combination with the memory 511 (e.g., the software 212), may comprise means for receiving the PRS configurations.

At stage 1414, the method 1400 includes measuring the first positioning signal during a first active time of the first DRX group. For example, at a processing stage 1516 the UE 200 may measure a PRS 1517, e.g., as shown in FIG. 7, the TRP1 PRS 712, from a TRP such as the TRP 300-1 (FIG. 15) during the active time 710 of a DRX cycle. The positioning signal may be a PRS resource, a PRS resource set, etc. The processor 510 may determine one or more characteristics of the received positioning signal such as time of arrival, angle of arrival, received signal strength, etc. The processor 510, in combination with the transceiver 515 (e.g., the wireless receiver 244) and possibly in combination with the memory 511 (e.g., the software 212), may comprise means for measuring the first positioning signal.

Figure 15:
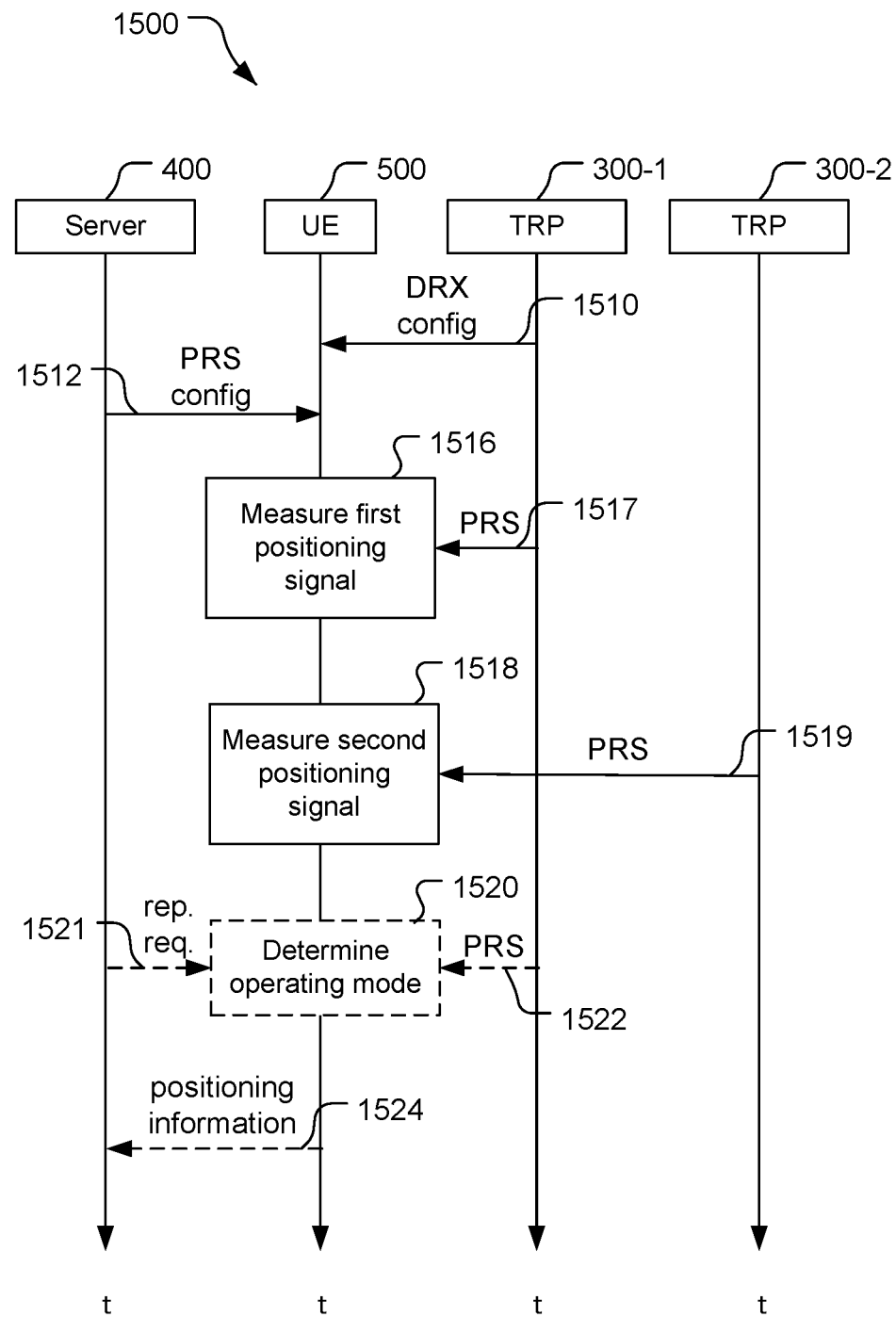
FIG. 15 is an example signal and processing flow for implementing the method shown in FIG. 14.

At stage 1416, the method 1400 includes measuring the second positioning signal during a fixed second active time or a variable third active time, the fixed second active time having a fixed duration of the second DRX group and the variable third active time having a variable duration of the second DRX group. For example, the UE 500 may operate in accordance with the fixed-active-time mode or the variable-active-time mode to measure the second positioning signal at stage 1518, e.g., to measure a PRS 1519, e.g., as shown in FIG. 7, the TRP2 PRS 722, from a TRP such as the TRP 300-2 (FIG. 15). The UE 500 may determine in which mode to operate, and may determine the mode before measuring positioning signals and/or after one or more positioning signals are measured. The UE 500 may change from one mode to the other, and thus may for some time (attempt to) measure the second positioning signal only during the fixed second active time (e.g., the active time 620, 720, 820) and for another time (attempt to) measure the second positioning signal during the variable third active time (e.g., the active time 830, and the active time portions 1320, 1324). For example, the UE 500 may be configured to default to the fixed-active-time mode and to determine whether to enter the variable-active-time mode (thus, the method 1400 may include determining the mode in which the UE 500 should operate). For example, the UE 500 may determine to enter the variable-active-time mode based on configuration information received from the server 400 (e.g., an indication that aperiodic reporting requests and/or aperiodic positioning signals may be received) and/or based on timing of reception of a positioning signal or report request, e.g., in response to receiving an aperiodic positioning signal and/or an aperiodic request for a positioning report. In FIG. 15, an optional stage 1520 is shown where the UE 500 determines the operating mode for measuring second positioning signals. In the example shown, the UE 500 (e.g., the processor 510) may use PRS configuration information in the message 1512, and/or an aperiodic report request 1521, and/or an aperiodic PRS 1522 to determine the operating mode, possibly involving changing the operating mode. The timing of the stage 1520 is, however, an example, and a determination of which operating mode to use may be made by the UE 500 at one or more other times (e.g., before the stage 1518 and/or before the stage 1516) in addition to and/or instead of the time of the stage 1520 shown. The processor 510, possibly in combination with the memory 511 (e.g., the software 212), may comprise means for measuring the second positioning signal.

The method 1400 may include one or more of the following features. For example, the method 1400 may include determining positioning information based on the first positioning signal and the second positioning signal. The processor 510, possibly in combination with the memory 511 (e.g., the software 212), may comprise means for determining the positioning information. The positioning signal may comprise at least one of a received signal time difference (RSTD) measurement, a position estimate, or a reference signal received power (RSRP) measurement. The positioning information may comprise at least one of an RSTD measurement across a plurality of transmission/reception points, an RSTD measurement across a plurality of frequency layers, an RSTD measurement of positioning reference signal (PRS) resources of different frequency layers, or an RSTD measurement of PRS resource sets of different frequency layers. The positioning information may comprise an RSRP measurement of a plurality of beams, an RSRP measurement of multiple positioning reference signal (PRS) resources, or an RSRP measurement across a plurality of transmission/reception points. The UE 500 may provide the positioning information 1524 to the server 400 (e.g., via a serving TRP such as the TRP 300-2), e.g., in response to a request for reporting the positioning information. The UE 500 may provide at least some the positioning information 1524 via LPP and/or NRPPa (New Radio Positioning Protocol A). The UE 500 may provide at least some of the positioning information through another interface such as a non-TRP interface (e.g., if measurement was with a non-TRP instead of the serving TRP) or another TRP (e.g., if there is a handoff to another TRP).

Also or alternatively, the method 1400 may include one or more of the following features. The method 1400 may include transmitting a transmitted reference signal by the UE, and determining a UE Rx-Tx based on at least one of the first positioning signal or the second positioning signal, and the transmitted reference signal. For example, the processor 510 may determine the time difference between receiving a PRS and transmitting a responsive SRS. The processor 510, in combination with the transceiver 515 (e.g., the wireless transmitter 242) and possibly in combination with the memory 511 (e.g., the software 212), may comprise means for transmitting the reference signal and means for determining the UE Rx-Tx. The method 1400 may include changing from measuring the second positioning signal during the fixed second active time to measuring the second positioning signal during the variable third active time. The processor 510, in combination with the transceiver 515 (e.g., the wireless transmitter 242) and possibly in combination with the memory 511 (e.g., the software 212), may comprise means for this changing. Measuring the second positioning signal (only) during the fixed second active time may be in response to the first and second positioning signal configurations indicating periodic transmission of the first and second positioning signals. The first and second positioning signals may each comprise a PRS resource or a PRS resource set. The first and second positioning signals may correspond to different frequency layers. The first and second positioning signals may be from different TRPs. The first and second positioning signal configurations may correspond to different frequency ranges.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. Components, functional or otherwise, shown in the figures and/or discussed herein as being connected or communicating with each other are communicatively coupled unless otherwise noted. That is, they may be directly or indirectly connected to enable communication between them.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B means that the item may be configured to perform the function regarding A, or may be configured to perform the function regarding B, or may be configured to perform the function regarding A and B. For example, a phrase of "a processor configured to measure at least one of A or B" means that the processor may be configured to measure A (and may or may not be configured to measure B), or may be configured to measure B (and may or may not be configured to measure A), or may be configured to measure A and B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A user equipment (UE) comprising:
a transceiver;
a memory; and
a processor communicatively coupled to the transceiver and the memory, wherein the processor is configured to:
receive, via the transceiver, a first discontinuous reception configuration for a first discontinuous reception group and a second discontinuous reception configuration for a second discontinuous reception group;
receive, via the transceiver, a first positioning signal configuration for a first positioning signal associated with the first discontinuous reception group and a second positioning signal configuration for a second positioning signal associated with the second discontinuous reception group;
measure the first positioning signal during a first active time of the first discontinuous reception group; and
measure the second positioning signal during a fixed second active time or during a variable third active time, the fixed second active time having a fixed duration of the second discontinuous reception group and the variable third active time having a variable duration of the second discontinuous reception group.

2. The UE of claim 1, wherein the variable third active time includes the fixed second active time.

3. The UE of claim 1, wherein the variable third active time ends no later than an end of the first active time.

4. The UE of claim 1, wherein the variable third active time comprises a plurality of separate time portions.

5. The UE of claim 1, wherein the fixed second active time has a shorter duration than a duration of the first active time.

6. The UE of claim 1, wherein the processor is configured to determine positioning information based on the first positioning signal and the second positioning signal.

7. The UE of claim 6, wherein the positioning information comprises at least one of a received signal time difference (RSTD) measurement, a position estimate, or a reference signal received power (RSRP) measurement.

8. The UE of claim 7, wherein the positioning information comprises an RSTD measurement across a plurality of transmission/reception points, an RSTD measurement across a plurality of frequency layers, an RSTD measurement of positioning reference signal (PRS) resources of different frequency layers, or an RSTD measurement of PRS resource sets of different frequency layers.

9. The UE of claim 7, wherein the positioning information comprises an RSRP measurement of a plurality of beams, an RSRP measurement of multiple positioning reference signal (PRS) resources, or an RSRP measurement across a plurality of transmission/reception points.

10. The UE of claim 1, wherein the processor is configured to determine a UE Rx-Tx based on at least one of the first positioning signal or the second positioning signal, and a transmitted reference signal sent by the processor via the transceiver.

11. The UE of claim 1, wherein the processor is configured to change from measuring the second positioning signal during the fixed second active time to measuring the second positioning signal during the variable third active time.

12. The UE of claim 1, wherein the processor is configured to respond to the first positioning signal configuration and the second positioning signal configuration indicating that the first positioning signal and the second positioning signal are scheduled for periodic transmission by causing the processor to measure the second positioning signal during the fixed second active time.

13. The UE of claim 1, wherein the processor is configured to determine whether to cause the processor to measure the second positioning signal during the fixed second active time or to measure the second positioning signal during the variable third active time based on timing of reception, via the transceiver, of at least one of the first positioning signal or a positioning reporting request.

14. The UE of claim 13, wherein the processor is configured to respond to receiving an aperiodic positioning reporting request by measuring the second positioning signal during the variable third active time.

15. The UE of claim 13, wherein the processor is configured to respond to receiving, aperiodically, the first positioning signal or the second positioning signal by measuring the second positioning signal during the variable third active time.

16. The UE of claim 13, wherein the processor is configured to respond to the first positioning signal configuration being indicative of aperiodic transmission, or the second positioning signal configuration being indicative of aperiodic transmission, by measuring the second positioning signal during the variable third active time.

17. The UE of claim 1, wherein the first positioning signal and the second positioning signal each comprise one of a positioning reference signal (PRS) resource or a PRS resource set.

18. The UE of claim 1, wherein:
the first positioning signal is implicitly associated with the first discontinuous reception group, the first positioning signal having a first frequency that is part of a first component carrier band, a first band combination, or a first frequency range of the first discontinuous reception group; or
the second positioning signal is implicitly associated with the second discontinuous reception group, the second positioning signal having a second frequency that is part of a second component carrier band, a second band combination, or a second frequency range of the second discontinuous reception group; or
a combination thereof.

19. A method of performing positioning operations at a user equipment (UE), the method comprising:
receiving, at the UE, a first discontinuous reception configuration for a first discontinuous reception group and a second discontinuous reception configuration for a second discontinuous reception group;
receiving, at the UE, a first positioning signal configuration for a first positioning signal associated with the first discontinuous reception group and a second positioning signal configuration for a second positioning signal associated with the second discontinuous reception group;
measuring, at the UE, the first positioning signal during a first active time of the first discontinuous reception group; and
measuring the second positioning signal during a fixed second active time or a variable third active time, the fixed second active time having a fixed duration of the second discontinuous reception group and the variable third active time having a variable duration of the second discontinuous reception group.

20. The method of claim 19, wherein the variable third active time includes the fixed second active time.

21. The method of claim 19, wherein the variable third active time ends no later than an end of the first active time.

22. The method of claim 19, wherein the variable third active time comprises a plurality of separate time portions.

23. The method of claim 19, wherein the fixed second active time has a shorter duration than a duration of the first active time.

24. The method of claim 19, further comprising determining positioning information based on the first positioning signal and the second positioning signal.

25. The method of claim 24, wherein the positioning information comprises at least one of a received signal time difference (RSTD) measurement, a position estimate, or a reference signal received power (RSRP) measurement.

26. The method of claim 25, wherein the positioning information comprises an RSTD measurement across a plurality of transmission/reception points, an RSTD measurement across a plurality of frequency layers, an RSTD measurement of positioning reference signal (PRS) resources of different frequency layers, or an RSTD measurement of PRS resource sets of different frequency layers.

27. The method of claim 25, wherein the positioning information comprises an RSRP measurement of a plurality of beams, an RSRP measurement of multiple positioning reference signal (PRS) resources, or an RSRP measurement across a plurality of transmission/reception points.

28. The method of claim 19, further comprising:
   transmitting a transmitted reference signal by the UE; and
   determining a UE Rx-Tx based on at least one of the first positioning signal or the second positioning signal, and the transmitted reference signal.

29. The method of claim 19, further comprising changing from measuring the second positioning signal during the fixed second active time to measuring the second positioning signal during the variable third active time.

30. The method of claim 19, wherein the method comprises measuring the second positioning signal during the fixed second active time in response to the first positioning signal configuration and the second positioning signal configuration being indicative of periodic transmission of the first positioning signal and the second positioning signal, respectively.

31. The method of claim 19, further comprising determining whether to measure the second positioning signal during the fixed second active time or to measure the second positioning signal during the variable third active time based on timing of reception of at least one of the first positioning signal or a positioning reporting request.

32. The method of claim 31, further comprising responding to receiving an aperiodic positioning reporting request by measuring the second positioning signal during the variable third active time.

33. The method of claim 31, further comprising responding to receiving, aperiodically, the first positioning signal or the second positioning signal by measuring the second positioning signal during the variable third active time.

34. The method of claim 31, further comprising responding to the first positioning signal configuration being indicative of aperiodic transmission, or the second positioning signal configuration being indicative of aperiodic transmission, by measuring the second positioning signal during the variable third active time.

35. The method of claim 19, wherein the first positioning signal and the second positioning signal each comprise one of a positioning reference signal (PRS) resource or a PRS resource set.

36. The method of claim 35, wherein the first positioning signal and the second positioning signal are from different frequency layers.

37. The method of claim 19, wherein the first positioning signal and the second positioning signal are from different transmission/reception points.

38. The method of claim 19, wherein the first positioning signal configuration and the second positioning signal configuration correspond to different frequency ranges, respectively.

39. A non-transitory, processor-readable storage medium comprising processor-readable instructions to cause a processor to:
   receive, via a transceiver, a first discontinuous reception configuration for a first discontinuous reception group and a second discontinuous reception configuration for a second discontinuous reception group;
   receive, via the transceiver, a first positioning signal configuration for a first positioning signal associated with the first discontinuous reception group and a second positioning signal configuration for a second positioning signal associated with the second discontinuous reception group;
   measure the first positioning signal during a first active time of the first discontinuous reception group; and
   measure the second positioning signal during a fixed second active time or during a variable third active time, the fixed second active time having a fixed duration and the variable third active time having a variable duration.

40. A user equipment (UE) comprising:
   means for receiving a first discontinuous reception configuration for a first discontinuous reception group and a second discontinuous reception configuration for a second discontinuous reception group;
   means for receiving a first positioning signal configuration for a first positioning signal associated with the first discontinuous reception group and a second positioning signal configuration for a second positioning signal associated with the second discontinuous reception group;
   means for measuring the first positioning signal during a first active time of the first discontinuous reception group; and
   means for measuring the second positioning signal during a fixed second active time or during a variable third active time, the fixed second active time having a fixed duration of the second discontinuous reception group and the variable third active time having a variable duration of the second discontinuous reception group.

* * * * *